(12) United States Patent
Urabayashi

(10) Patent No.: US 10,973,050 B2
(45) Date of Patent: Apr. 6, 2021

(54) COMMUNICATION CONTROL METHOD, RADIO TERMINAL, AND BASE STATION

(71) Applicant: KYOCERA CORPORATION, Kyoto (JP)

(72) Inventor: Hiroyuki Urabayashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/140,222

(22) Filed: Sep. 24, 2018

(65) Prior Publication Data

US 2019/0037600 A1    Jan. 31, 2019

Related U.S. Application Data

(63) Continuation of application No. PCT/JP2017/012252, filed on Mar. 27, 2017.

(60) Provisional application No. 62/315,867, filed on Mar. 31, 2016.

(51) Int. Cl.
| | | |
|---|---|---|
| *H04W 74/08* | (2009.01) | |
| *H04W 16/14* | (2009.01) | |
| *H04W 74/00* | (2009.01) | |
| *H04W 76/27* | (2018.01) | |
| *H04W 72/14* | (2009.01) | |
| H04W 72/12 | (2009.01) | |

(52) U.S. Cl.
CPC ....... *H04W 74/0808* (2013.01); *H04W 16/14* (2013.01); *H04W 72/14* (2013.01); *H04W 74/006* (2013.01); *H04W 76/27* (2018.02); H04W 72/1289 (2013.01)

(58) Field of Classification Search
CPC . H04W 74/0808; H04W 76/27; H04W 16/14; H04W 72/14; H04W 74/006
See application file for complete search history.

(56) References Cited

U.S. PATENT DOCUMENTS

| | | | |
|---|---|---|---|
| 2016/0337867 A1* | 11/2016 | Uchino | H04W 16/14 |
| 2016/0366689 A1* | 12/2016 | Zhang | H04W 72/0453 |
| 2017/0135128 A1* | 5/2017 | Yerramalli | H04W 74/006 |
| 2017/0202022 A1* | 7/2017 | Chendamarai Kannan | |
| | | | H04W 74/0816 |
| 2017/0237539 A1* | 8/2017 | Xu | H04L 5/0055 |

(Continued)

FOREIGN PATENT DOCUMENTS

JP    2019-110609    *   7/2019    ............ H04W 16/14

OTHER PUBLICATIONS

MediaTek Inc.; "Uplink channel access in LAA"; 3GPP TSG RAN WG1 Meeting #84; R1-160976; Feb. 15-19, 2016; pp. 1-11; St Julian's, Malta.

(Continued)

*Primary Examiner* — Ronald B Abelson
(74) *Attorney, Agent, or Firm* — Studebaker & Brackett PC

(57) ABSTRACT

A radio terminal according to one embodiment is used in a mobile communication system supporting uplink transmission using an unlicensed spectrum. The user terminal comprises a controller configured to perform LBT (Listen-Before-Talk) before the uplink transmission. The controller applies a first LBT scheme to the LBT, in response to reception of information indicating the first LBT scheme from a base station. The controller applies a second LBT scheme to the LBT, in response to reception of information indicating the second LBT scheme with a shorter LBT time interval than the first LBT scheme, from the base station.

4 Claims, 11 Drawing Sheets

(56) References Cited

U.S. PATENT DOCUMENTS

2017/0347270 A1* 11/2017 Iouchi .................. H04W 16/14
2018/0035257 A1* 12/2018 Yang ..................... H04W 74/08
2018/0352573 A1* 12/2018 Yang ................ H04W 74/0808

OTHER PUBLICATIONS

Ericsson; "WF on UL LBT Signaling"; 3GPP TSG RAN WG1 #84; R1-161386; Feb. 15-19, 2016; St Julian's, Malta.
"RAN1 Chairman's Notes"; 3GPP TSG RAN WG1 Meeting #84; Feb. 15-19, 2016; St Julian's, Malta.
Qualcomm; "Summary of Email discussion, [84-16] Discussion on UL traffic multiplexing".
Huawei, HiSilicon; "Summary on [85-14] PUSCH frame structure in eLAA"; 3GPP TSG RAN WG1 Meeting #84bis; Apr. 11-15, 2016; Busan, Korea.
LG Electronics, "LBT schemes in LAA UL", 3GPP TSG RAN WGS Meeting #84, R1-160630, Feb. 15-19, 2016, pp. 1-12, St. Julian's, Malta.
Ericsson, "On Coordinated UL Channel Access for Enhanced LAA", 3GPP TSG RAN WGS Meeting #84, R1-161000, Feb. 15-19, 2016, pp. 1-5, St. Julian's, Malta.

\* cited by examiner

UL Tx WITHIN MCOT

SELF-SCHEDULING                XCS

UL Tx OUT OF MCOT

COMMUNICATION CONTROL METHOD, RADIO TERMINAL, AND BASE STATION

CROSS-REFERENCE TO RELATED APPLICATION

The present application is a continuation based on PCT Application No. PCT/JP2017/012252 filed on Mar. 27, 2017, which claims the benefit of U.S. Provisional Application No. 62/315,867 (filed on Mar. 31, 2016). The content of which is incorporated by reference herein in their entirety.

FIELD

The present disclosure relates to a communication control method, a radio terminal, and a base station used in a mobile communication system.

BACKGROUND

In 3GPP (3rd Generation Partnership Project) which is a project aiming to standardize a mobile communication system, LAA (Licensed-Assisted Access) is introduced to Release 13 specifications. LAA is a technology in which at least one secondary cell (SCell) operating in an unlicensed spectrum is used in carrier aggregation. Such a SCell is referred to as "LAA SCell". The unlicensed spectrum may be referred to as "unlicensed frequency band".

In Release 13, an LAA SCell is limited to a downlink. A base station performs LBT (Listen-Before-Talk) before performing a downlink transmission on the LAA SCell. Specifically, the base station monitors/senses a channel on the LAA SCell to determine whether the channel is free or busy. When determining that the channel is free, the base station performs a downlink transmission, and otherwise, does not perform a downlink transmission.

In Release 14, it is scheduled to develop specifications to support LAA in an uplink. However, currently, it is not clear how LBT is handled in an uplink transmission using an unlicensed spectrum.

SUMMARY

A communication control method according to one embodiment is used in a mobile communication system supporting uplink transmission using an unlicensed spectrum. The communication methods comprises the steps of: selecting, by a base station, as a scheme of LBT (Listen-Before-Talk) that a radio terminal needs to apply, one of a first LBT scheme and a second LBT scheme with a shorter LBT time interval than the first LBT scheme; transmitting, by the base station, information indicating the selected LBT scheme, to the radio terminal; performing, by the radio terminal, LBT of the first LBT scheme before the uplink transmission, in response to reception of information indicating the first LBT scheme from the base station; and performing, by the radio terminal, LBT of the second LBT scheme before the uplink transmission, in response to reception of information indicating the second LBT scheme from the base station.

The uplink transmission may include a PUSCH transmission in a secondary cell employed in the unlicensed spectrum.

The communication control method may further comprising the steps of: transmitting, by the base station, an uplink grant for scheduling the PUSCH transmission in the secondary cell, to the radio terminal; and receiving, by the radio terminal, the uplink grant from the base station. The uplink grant may include information indicating an LBT scheme selected by the base station.

A radio terminal according to one embodiment is used in a mobile communication system supporting uplink transmission using an unlicensed spectrum. The user terminal comprises a controller configured to perform LBT (Listen-Before-Talk) before the uplink transmission. The controller applies a first LBT scheme to the LBT, in response to reception of information indicating the first LBT scheme from a base station. The controller applies a second LBT scheme to the LBT, in response to reception of information indicating the second LBT scheme with a shorter LBT time interval than the first LBT scheme, from the base station.

A base station according to one embodiment is used in a mobile communication system supporting uplink transmission using an unlicensed spectrum. The base station comprises a controller configured to select, as a scheme of LBT (Listen-Before-Talk) that a radio terminal needs to apply, one of a first LBT scheme and a second LBT scheme with a shorter LBT time interval than the first LBT scheme. The controller performs a process of transmitting, to the radio terminal, information indicating the selected LBT scheme.

A radio terminal according to one embodiment is used in a mobile communication system supporting uplink transmission using an unlicensed spectrum. The radio terminal comprises a controller configured to perform LBT (Listen-Before-Talk) before the uplink transmission. The controller determines whether or not another radio terminal is being executing the uplink transmission. The controller applies a first LBT scheme to the LBT, in response to a determination that the other radio terminal is not being executing the uplink transmission. The controller applies a second LBT scheme with a shorter LBT time interval than the first LBT scheme to the LBT, in response to a determination that the other radio terminal is being executing the uplink transmission.

The controller may determine whether or not the other radio terminal is being executing the uplink transmission, based on a predetermined radio signal transmitted from the other radio terminal. The predetermined radio signal may be a radio signal indicating that the other radio terminal starts the uplink transmission.

The controller may receive, from a base station, predetermined allocation information indicating an uplink radio resource, for the uplink transmission, allocated to the other radio terminal. The controller may determine whether or not the other radio terminal is being executing the uplink transmission, based on the predetermined allocation information and an uplink signal transmitted from the other radio terminal.

A radio terminal according to one embodiment is used in a mobile communication system supporting uplink transmission using an unlicensed spectrum. The radio terminal comprises a controller configured to perform LBT (Listen-Before-Talk) before the uplink transmission. While starting the uplink transmission, the controller performs a process of transmitting, to another radio terminal, a predetermined radio signal indicating that the uplink transmission is started.

A base station according to one embodiment is used in a mobile communication system supporting uplink transmission using an unlicensed spectrum. The base station comprises a controller configured to allocate an uplink radio resource, for the uplink transmission, to a first radio terminal and to notify the first radio terminal of predetermined allocation information. The predetermined allocation information is allocation information, for the uplink transmission, indicating an uplink radio resource allocated to a second radio terminal different from the first radio terminal.

DESCRIPTION OF THE EMBODIMENT (Configuration of Mobile Communication System)

Figure 1:
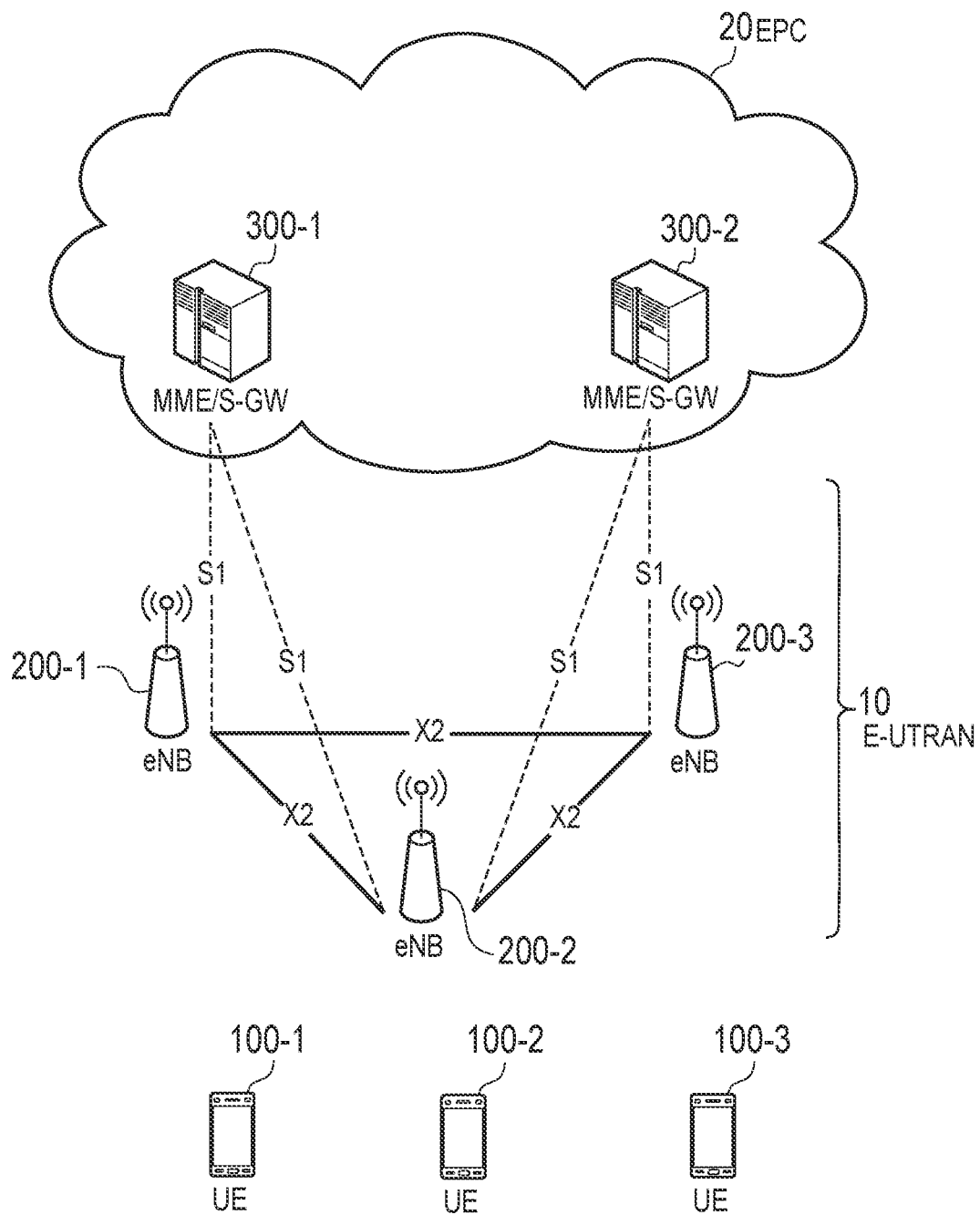
FIG. 1 is a diagram illustrating a configuration of an LTE system according to an embodiment.

Hereinafter, the configuration of the mobile communication system according to the embodiment will be described. FIG. 1 is a diagram showing a configuration of an LTE (Long Term Evolution) system which is a mobile communication system according to the embodiment. The LTE system is a mobile communication system based on the 3rd Generation Partnership Project (3GPP) standard.

(Configuration of Mobile Communication System)

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell).

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area. the "cell" may be also used as a term indicating a function of performing radio communication with the UE 100.

The EPC 20 corresponds to a core network. The EPC 20 includes a plurality of MME (Mobility Management Entity)/ S-GWs (Serving-Gateways) 300. The MME performs various mobility controls and the like for the UE 100. The S-GW performs control to transfer data. MME/S-GW 300 is connected to eNB 200 via an S1 interface.

(Configuration of Radio Terminal)

Figure 2:
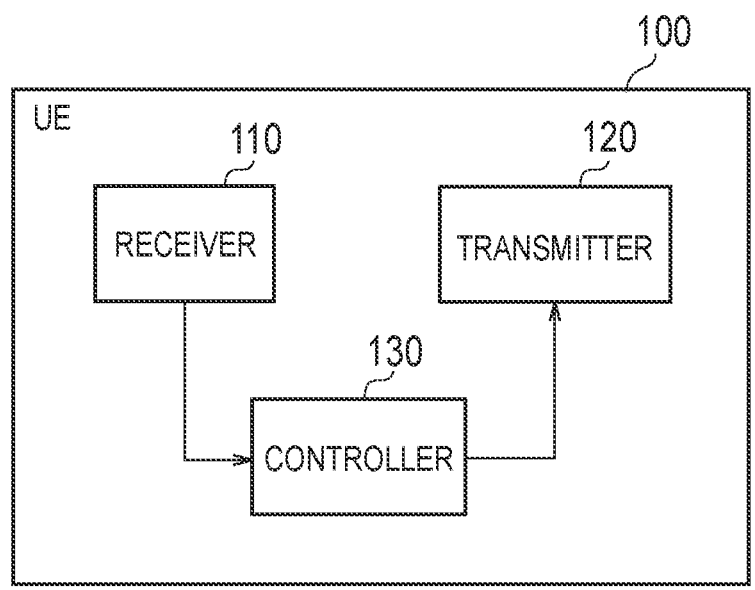
FIG. 2 is a diagram illustrating a configuration of a UE (radio terminal) according to the embodiment.

FIG. 2 is a diagram of the configuration of UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal). The receiver unit outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal The transmitter unit transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor a CPU (Central Processing Unit). The baseband processor performs modulation and demodulation, encoding and decoding and the like of a baseband signal. The CPU performs various processes by executing the program stored in the memory. The number of processors may be one, or two or more. The processor executes below-described processes.

Figure 3:
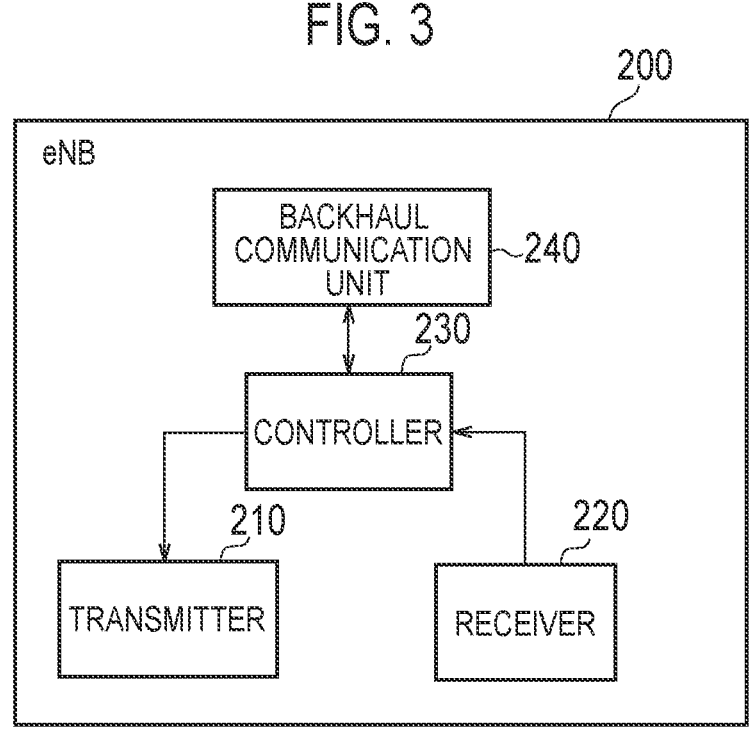
FIG. 3 is a diagram illustrating a configuration of an eNB (base station) according to the embodiment.

FIG. 3 is a diagram illustrating configuration of the eNB 200 (base station). As illustrated in FIG. 3, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal. The transmitter unit transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal). The receiver unit outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor and a CPU (Central Processing Unit). The baseband processor performs modulation and demodulation, encoding and decoding and the like of a baseband signal. The CPU performs various processes by executing the program stored in the memory. The number of processors may be one, or two or more. The processor executes below-described processes.

The backhaul communication unit 240 is connected to a neighboring eNB 200 via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 4:
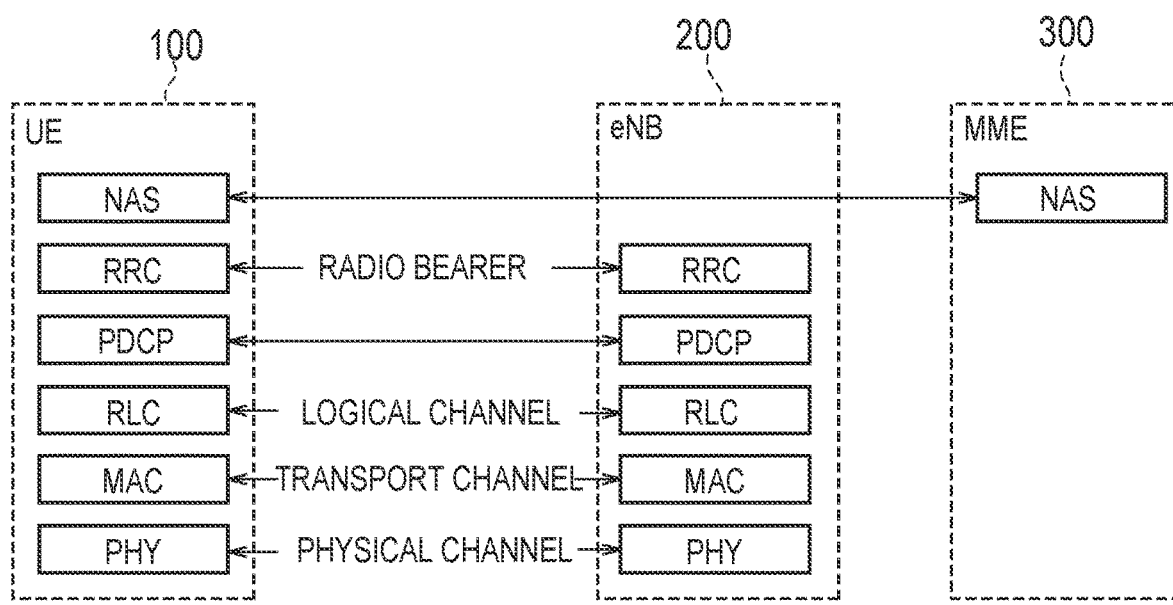
FIG. 4 is a diagram illustrating a configuration of a protocol stack of a radio interface according to the embodiment.

FIG. 4 is a diagram illustrating protocol stack of a radio interface in the LTE system. As illustrated in FIG. 4, the radio interface protocol is classified into a layer 1 to a layer 3 of an OSI reference model. The layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control information are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control information are transmitted via a transport channel. The MAC layer of the eNB 200 includes a scheduler. The scheduler determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

Figure 5:
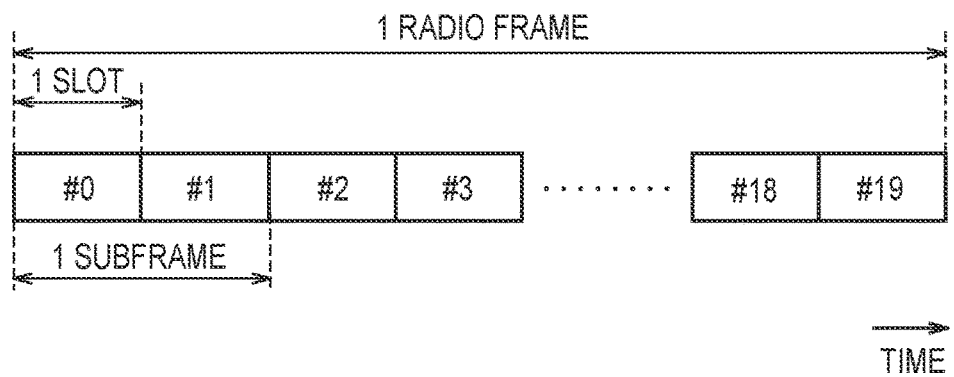
FIG. 5 is a diagram illustrating a configuration of a radio frame according to the embodiment.

FIG. 5 is a configuration diagram of a radio frame used in the LTE system. In the LTE system, OFDMA (Orthogonal Frequency Division Multiplexing Access) is applied to a downlink. In the LTE system, SC-FDMA (Single Carrier Frequency Division Multiple Access) is applied to an uplink.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a region used as a physical downlink control channel (PDCCH) for mainly transmitting control information. Furthermore, the other portion of each subframe is a region available as a physical downlink shared channel (PDSCH) for mainly transmitting downlink data.

In general, the eNB 200 uses the PDCCH to transmit downlink control information (DCI) to the UE 100, and uses the PDSCH to transmit the downlink data to the UE 100. The downlink control information carried by the PDCCH includes uplink scheduling information, downlink scheduling information, and a TPC command. The uplink scheduling information is scheduling information related to an allocation of an uplink radio resource (UL grant), and the downlink scheduling information is scheduling information related to an allocation of a downlink radio resource. The TPC command is information for instructing an increase or decrease in the uplink transmission power. In order to identify a UE 100 to which the downlink control information is transmitted, the eNB 200 includes, into the downlink control information, a CRC bit scrambled by an identifier (RNTI: Radio Network Temporary ID) of the UE 100 to which the downlink control information is transmitted. Each UE 100, for the downlink control information that may be addressed to the UE 100, after descrambling the RNTI of the UE 100, checks CRC so as to perform blind decoding of the PDCCH to detect the downlink control information addressed to the UE 100. The PDSCH carries the downlink data by the downlink radio resource (resource block) indicated by the downlink scheduling information.

In the uplink, both ends in the frequency direction of each subframe are control regions used as a physical uplink control channel (PUCCH) for mainly transmitting an uplink control information. Furthermore, the other portion of each subframe is a region available as a physical uplink shared channel (PUSCH) for mainly transmitting uplink data.

In general, the UE 100 uses the PUCCH to transmit uplink control information (UCI) to the eNB 200, and uses the PUSCH to transmit the uplink data to the eNB 200. The uplink control information carried by the PUCCH includes a CQI (Channel Quality Indicator), a PMI (Precoding Matrix Indicator), an RI (Rank Indicator), a scheduling request (SR), and a HARQ ACK/NACK. The CQI is an index indicating a downlink channel quality and is used for deciding an MCS to be used for the downlink transmission, for example. The PMI is an index indicating a precoder matrix desirably used for the downlink transmission. The RI is an index indicating the number of layers (the number of streams) available for the downlink transmission. The SR is information for requesting an allocation of a PUSCH resource. The HARQ ACK/NACK is delivery acknowledgment information indicating whether or not the downlink data is correctly received.

(Application Scenario)

Figure 6:
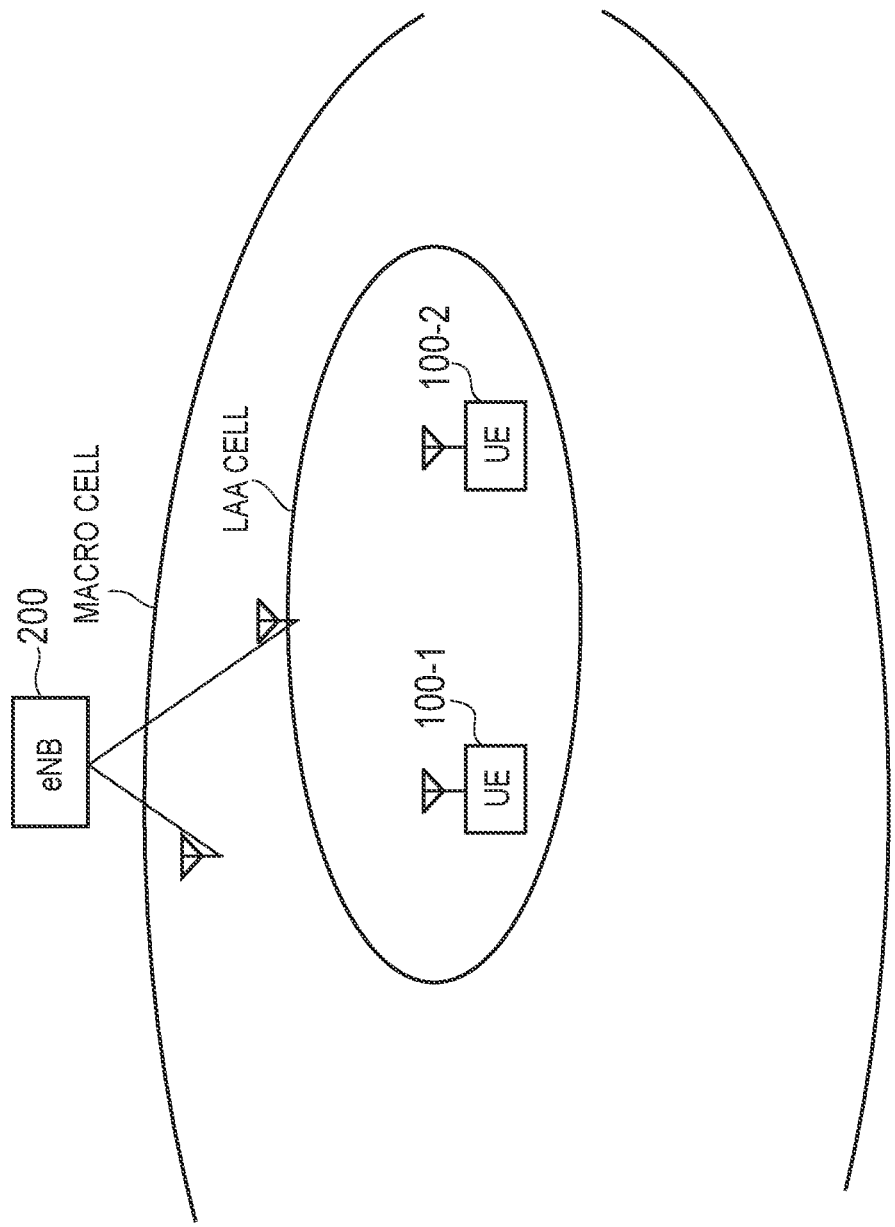
FIG. 6 is a diagram illustrating an application scenario according to the embodiment.

An application scenario according to the embodiment will be described. FIG. 6 is a diagram illustrating the application scenario according to the embodiment.

As illustrated in FIG. 6, the eNB 200 manages a macro cell and an LAA cell. The macro cell operates in a licensed spectrum. The LAA cell operates in an unlicensed spectrum. The licensed spectrum is a frequency band of which the license is granted to an operator. The unlicensed spectrum is a frequency band of which the license is not granted to an operator. FIG. 6 illustrates an example in which the LAA cell is a small cell.

The UEs 100 (a UE 100-1 and a 100-2) are located in an overlapping region of the macro cell and the LAA cell. Each of the UEs 100 is in an RRC connected mode on the macro cell. The UE 100 performs LAA communication. Specifically, the UE 100 performs carrier aggregation communication where the macro cell is set as a primary cell (PCell)

and the LAA cell is set as a secondary cell (PCell). That is, the UE 100 is allocated with both a radio resource of the macro cell and a radio resource of the LAA cell. The allocation of the radio resource of the macro cell is performed using PDCCH of the macro cell. The allocation of the radio resource of the LAA cell may be performed using PDCCH of the LAA cell or performed using the PDCCH of the macro cell. The latter allocation method is referred to as "cross carrier scheduling".

The mobile communication system according to the embodiment supports LAA in the uplink (UL) in addition to LAA in the downlink (DL). That is, the mobile communication system according to the embodiment supports DL transmission and UL transmission using the unlicensed spectrum.

The unlicensed spectrum is a frequency band shared among a plurality of communication systems and/or a plurality of operators, and thus, LBT (Listen-Before-Talk) is obligatory. Specifically, a device using the unlicensed spectrum monitors/senses a channel on the LAA cell to determine whether the channel is free or busy. When determining that the channel is free (that is, if the LBT is successful), the device performs transmission, and otherwise, does not perform the transmission. When making a successful LBT, the device is allowed to occupy the channel for a predetermined duration. A maximum time length during which the channel is continuously occupied is referred to as MCOT (Maximum Channel Occupancy Time).

The mobile communication system according to the embodiment employs, as an LBT scheme, a scheme called a category 4 (Cat. 4). The Cat. 4 may be referred to as LBE (Load Based Equipment) scheme. A time length of the Cat. 4 LBT (LBT time interval) is, for example, set to "16+ CW*9" (us), however, a range that CW can take varies depending on a type of data. When there is no interference, a shortest time length of the Cat. 4 LBT is 43 us, and a longest one is 9223 us.

Figure 7:
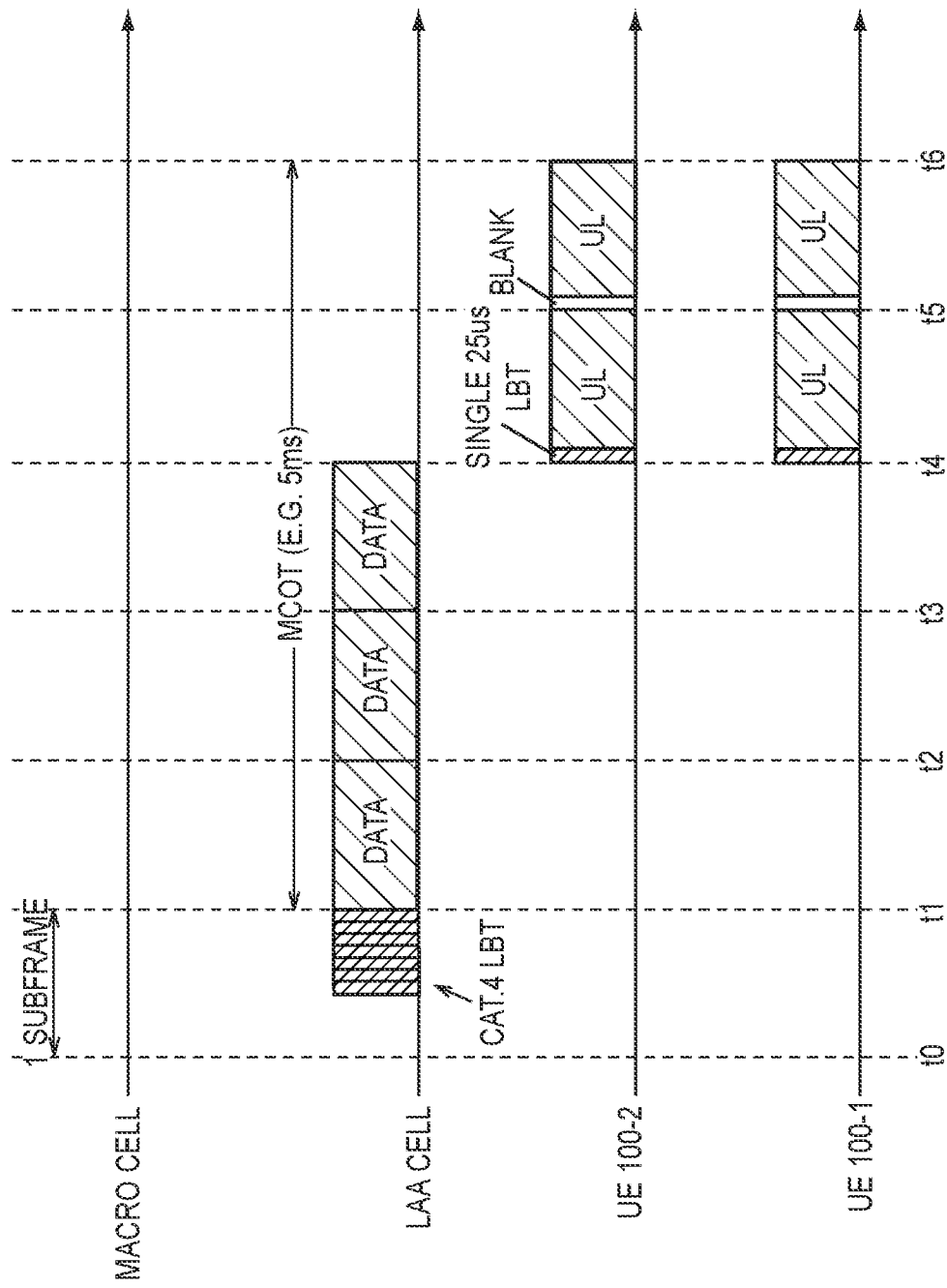
FIG. 7 is a diagram illustrating a first example of MCOT according to the embodiment.

FIG. 7 is a diagram illustrating a first example of the MCOT. The first example is an example in which the UL transmission is performed continuously to the DL transmission. FIG. 7 illustrates an example in which the MCOT is 5 ms (that is, five subframes).

As illustrated in FIG. 7, the eNB 200 performs a Cat. 4-based LBT on the LAA cell. When the Cat. 4-based LBT is successful, the eNB 200 starts DL transmission at time t1, and continuously transmits (performs a burst transmission of) DL data (Data) until time t4. Further, the eNB 200 allocates UL radio resources in two subframes of time t4 to t6, to the UE 100-1 and the 100-2. Each of the UEs 100 starts the LBT at time t4, in response to the allocation (UL grant) from the eNB 200. In the MCOT, the LBT for an LBT time interval (for example, 25 μs) shorter than usual is permitted. In the following, a scheme of the LBT for such a short time is referred to as "Single LBT". Each of the UEs 100 succeeds in the Single-based LBT, and starts the UL transmission. FIG. 7 illustrates an example in which an initial timing of time t5 is set as a non-transmission period (Blank) for the Single-based LBT.

Thus, within the MCOT, the channel can be used while the period of the UL transmission is considered as a part of the period of the DL transmission. In addition, within the MCOT, the Single-based LBT can be applied instead of the Cat. 4-based LBE. Thus, each of the UEs 100 can perform the UL transmission after finishing the LBT in a short time.

Figure 8:
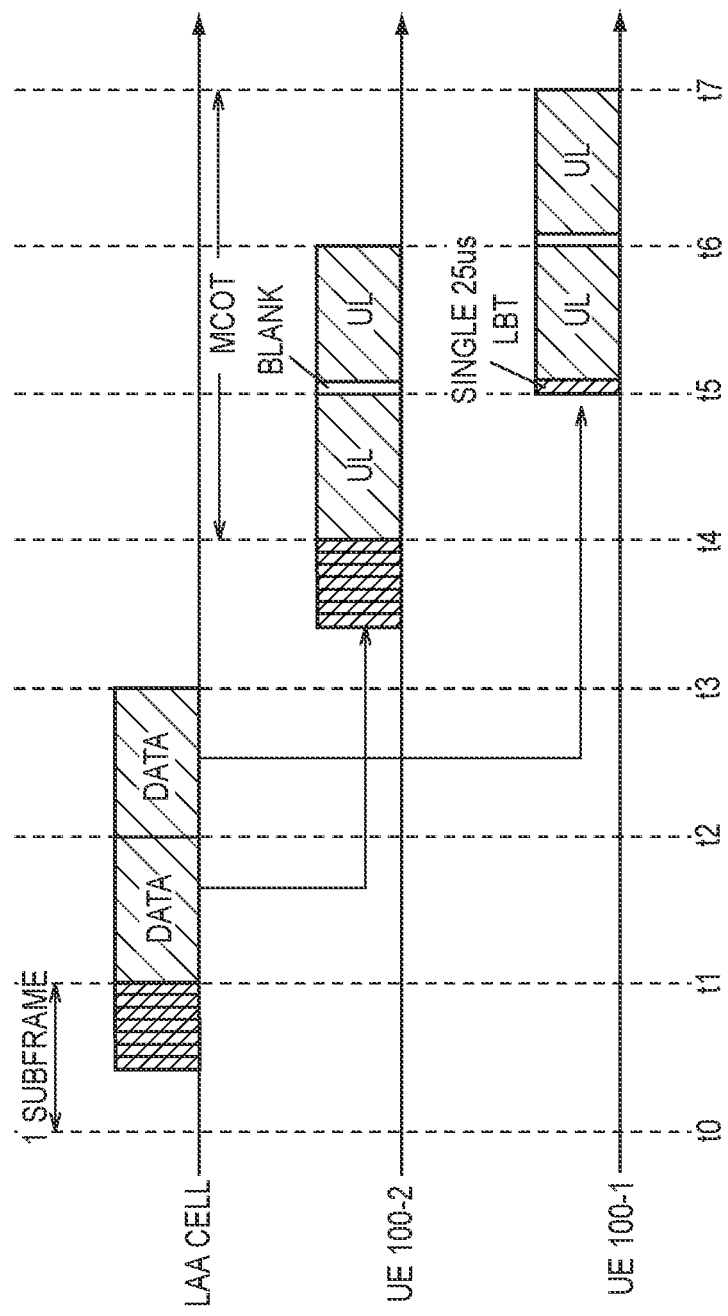
FIG. 8 is a diagram illustrating a second example of the MCOT according to the embodiment.

FIG. 8 is a diagram illustrating a second example of MCOT. The second example is an example in which the UL transmission is performed discontinuously to the DL transmission. FIG. 8 illustrates an example in which the MCOT is 3 ms (that is, three subframes).

As illustrated in FIG. 8, the eNB 200 performs the Cat. 4-based LBT on the LAA cell. When the Cat. 4-based LBT is successful, the eNB 200 starts the DL transmission at time t1, and continuously transmits (performs a burst transmission of) DL data (Data) until time t3. Further, the eNB 200 allocates UL radio resources in two subframes of time t4 to t6, to the UE 100-2. Further, the eNB 200 allocates UL radio resources in two subframes from times t5 to t7, to the UE 100-1. The UE 100-2 performs the Cat. 4-based LBT until time t4, in response to the allocation (UL grant) from the eNB 200. The UE 100-2 succeeds in the Cat. 4-based LBT, and starts UL transmission. The UE 100-1 starts the Single-based LBT at time t5, in response to the allocation (UL grant) from the eNB 200. The UE 100-1 succeeds in the Single-based LBT, and starts UL transmission.

In this way, even if only the UL is concerned, within the MCOT, the Single-based LBT should be allowed to be applied instead of the Cat. 4-based LBE. Thus, the UE 100-1 can perform the UL transmission after finishing the LBT in a short time. In an example of FIG. 8, a condition that the UE 100-1 can apply the Single-based LBT is that the UE 100-2 has already started the UL transmission (that is, the UE 100-2 is being executing the UL transmission).

The following first to third embodiments are an embodiment in which an operation as illustrated in FIG. 8 is enabled.

First Embodiment

The first embodiment will be described. In the first embodiment, the above-described application scenario is assumed.

The UE 100 according to the first embodiment performs LBT before UL transmission using an unlicensed spectrum (hereinafter, simply referred to as "UL transmission"). The UE 100 determines whether or not another UE is being executing UL transmission. Based on a determination that the other UE is not being executing UL transmission, the UE 100 applies the Cat. 4-based (first LBT scheme) LBT. On the other hand, in response to a determination that the other UE is being executing the UL transmission, the UE 100 applies, to the LBT" the Single scheme (second LBT scheme) with a shorter LBT time interval than the Cat. 4 scheme.

Thus, the UE 100 according to the first embodiment autonomously determines whether or not another UE is being executing UL transmission, and based on a determination result, selectively uses either the Cat. 4 scheme or the Single scheme. Thus, it is possible to appropriately apply the Single-based LBT instead of the Cat. 4-based LBE.

In the first embodiment, Indication (predetermined radio signal) for determining whether or not the other UE is being executing UL transmission is introduced. While starting UL transmission, the UE 100 transmits an Indication indicating that the UL transmission is stated, to another UE. In other words, the UE 100 that started the UL transmission transmits an Indication indicating the start to another UE. The Indication is preferably configured to be capable of identifying a serving cell of a UE from which the Indication is transmitted. For example, the Indication is data encoded/scrambled with an identifier (Cell Id) of the cell of the eNB 200 (that is, the LAA cell). Alternatively, the Indication may be a reference signal (for example, SRS: Sounding Reference Signal) including a sequence generated by the Cell ID. Configuration information of the Indication (hereinafter, referred to as "Indication Config.") is configured by the eNB

200. In this case, the Indication Config. is transmitted and received by broadcast RRC signaling (for example, SIB: System Information Block) or PDCCH (UL grant). The Indication Config. may be transmitted and received by UE dedicated RRC signaling (for example, "RRC Connection Reconfiguration"). The RRC signaling is transmitted and received on the PCell (macro cell) of the UE 100. Alternatively, the Indication Config. may be defined according to the specifications, and may be predefined for the UE 100. The Indication Config. includes at least one of band information, transmission symbol information, transmission subframe information, and sequence information. If the Indication Config. is predefined, 1-bit trigger information by which the Config. is applied may be transmitted and received.

The UE 100 attempting to start UL transmission determines whether or not another UE is being executing UL transmission, based on an Indication transmitted from the other UE. The UE 100 applies the Cat. 4-based LBT in response to determination that the other UE is not being executing UL transmission, and applies the Single-based LBT in response to determination that the other UE is being executing UL transmission. Specifically, the UE 100 attempting to start UL transmission performs a process of receiving an Indication according to the Indication Config. When decoding of the Indication is successful or when a received power (and/or a correlation value) of the Indication (a reference signal) exceeds a threshold value, the UE 100 determines that the other UE 100 has already started UL transmission and determines that as the LBT of the UE 100, the Single-based LBT is appropriate. On the other hand, when decoding of the Indication is not successful, or the received power (and/or the associated value) of the Indication (a reference signal) does not exceed the threshold value, the UE 100 determines that the other UE 100 has not started UL transmission and attempts UL transmission by applying the Cat. 4-based LBT. The threshold value may be configured from the eNB 200, or predefined for the UE 100.

The UE 100 configured with DRX (Discontinuous Reception) turns on a receiver unit at a timing at which to monitor the Indication from the other UE 100 in addition to at a PDCCH monitoring timing (that is, On duration) of a normal DRX.

Figure 9:
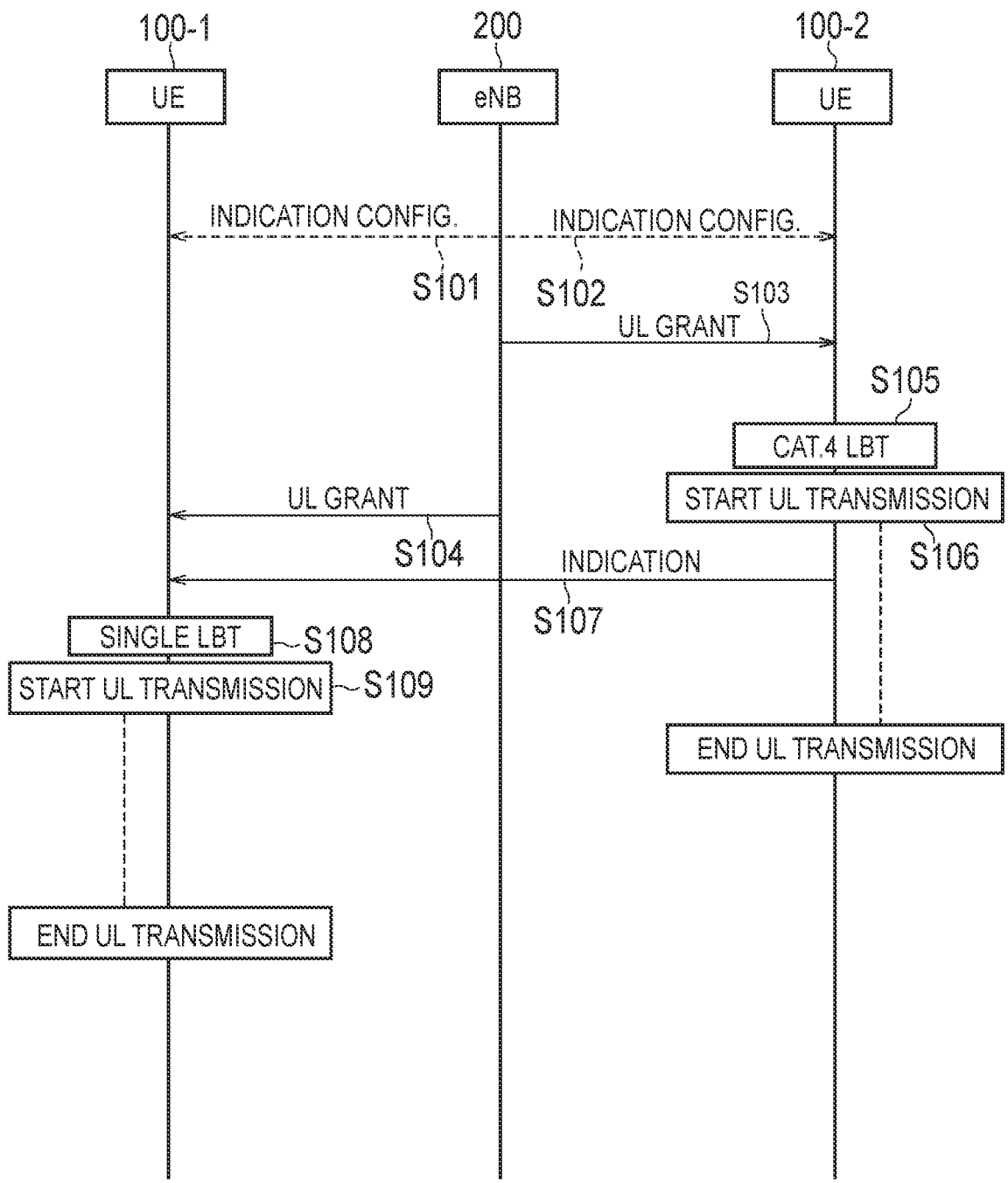
FIG. 9 is a diagram illustrating an operation example according to a first embodiment.

FIG. 9 is a diagram illustrating an operation example according to the first embodiment. In an initial state of FIG. 9, the UE 100-1 and the UE 100-2 are in the RRC connected mode.

As illustrated in FIG. 9, in step S101 and S102, the eNB 200 transmits the Indication Config. to the UE 100-1 and the UE 100-2. It is noted that in step S103 and S104, the Indication Config. may be transmitted together with the UL grant. The UE 100-1 and the UE 100-2 store the received Indication Config. and applies the same to a subsequent transmission and reception of the Indication.

In step S103, the eNB 200 transmits the UL grant to the UE 100-2. The UL grant includes information and the like indicating a resource block (RB) to be allocated to the UE 100-2 in the SCell (LAA cell). The eNB 200 may transmit the UL grant on the SCell (LAA cell), and may transmit the UL grant on the PCell (macro cell).

In step S104, the eNB 200 transmits the UL grant to the UE 100-1. The UL grant includes information and the like indicating a resource block (RB) to be allocated to the UE 100-1 in the SCell (LAA cell).

In step S105, the UE 100-2 does not receive an Indication from another UE, and thus, the UE 100-2 performs the Cat. 4-based LBT before performing UL transmission. Here, a description will be given on the assumption that the UE 100-2 succeeds in the LBT.

In step S106, the UE 100-2 starts UL transmission in response to the LBT being successful. The UE 100-2 uses an RB allocated, on the SCell (LAA cell), based on the UL grant to transmit uplink data (PUSCH) and the like to the eNB 200. The UE 100-2 performs the UL transmission in a burst manner over a period (for example, a plurality of subframes) allocated based on the UL grant.

In step S107, the UE 100-2 that started the UL transmission transmits the Indication indicating the start to another UE. A transmission timing and a transmission resource (an RB, a sequence or the like) of the Indication are based on the Indication Config. The UE 100-1 attempting to start UL transmission determines whether or not the UE 100-2 is being executing the UL transmission, based on the Indication transmitted from the UE 100-2. The UE 100-1 succeeds in receiving the Indication and determines that the UE 100-2 is being executing the UL transmission.

In step S108, in response to a determination that the UE 100-2 is being executing the UL transmission, the UE 100-1 applies the Single-based LBT. Here, a description will be given on the assumption that the UE 100-1 succeeds in the LBT.

In step S109, the UE 100-1 starts the UL transmission in response to the LBT being successful. The UE 100-1 uses an RB allocated based on the UL grant on the SCell (LAA cell) to transmit uplink data (PUSCH) and the like to the eNB 200. The UE 100-1 performs the UL transmission in a burst manner over a period (for example, a plurality of subframes) allocated based on the UL grant.

Modification of First Embodiment

In the first embodiment, the Indication may include information indicating a remaining burst length. In an example illustrated in FIG. 9, the UE 100-2 calculates a remaining time period (for example, the subframe number) of the MCOT at a time point at which the UE 100-2 transmits the Indication, and includes information indicating the remaining time period into the Indication. In response to the remaining time period included in the received Indication, the UE 100-1 determines a time length during which the UE 100-1 can execute the UL transmission, and performs the UL transmission within the remaining time period.

Second Embodiment

A second embodiment will be described while focusing on a difference from the first embodiment, below.

The first embodiment described above is an embodiment where an Indication for determining whether or not another UE is being executing UL transmission is introduced. On the other hand, in the second embodiment, rather than such a special signaling is not introduced, each UE 100 determines whether or not another UE is being executing UL transmission, based on a normal UL transmission of the other UE. In the second embodiment, the eNB 200 provides auxiliary information for facilitating such a determination, to each UE 100.

The eNB 200, the eNB 200 according to the second embodiment, while allocating a UL radio resource to the UE 100 for UL transmission, the eNB 200 notifies the UE 100 of predetermined allocation information. The predetermined allocation information is allocation information indicating a UL radio resource allocated to another UE for UL transmission. For example, during UL grant transmission, the eNB 200 notifies information on an RB allocated to another UE and information on an RB not allocated thereto.

In the second embodiment, the UE 100 receives the predetermined allocation information indicating the UL radio resource allocated, for the UL transmission of the other UE, from the eNB 200. The UE 100 attempting to start UL transmission determines whether or not the other UE is being executing the UL transmission, based on the predetermined allocation information and a UL signal transmitted from the other UE. Specifically, before starting the UL transmission (before starting LBT), the UE 100 measures the received power of each of the RB allocated to the other UE and the RB not allocated thereto, and calculates a power difference between the RB allocated to the other UE and the RB not allocated thereto. If the power difference is equal to or more than a threshold value, the UE 100 determines that the other UE is being executing the UL transmission and determines that the Single-based LBT is appropriate. On the other hand, if the power difference is equal to or less than the threshold value, the UE 100 determines that the other UE is not being executing the UL transmission, and applies the Cat. 4-based LBT. The threshold value may be configured from the eNB 200, or predefined for the UE 100. The eNB 200 may configure a Blank RB (or Blank RE) for facilitating the power measurement of the UE 100. The eNB 200 does not perform DL transmission of the Blank RB (or Blank RE) (that is, configures the DL transmission power of the Blank RB to zero).

Figure 10:
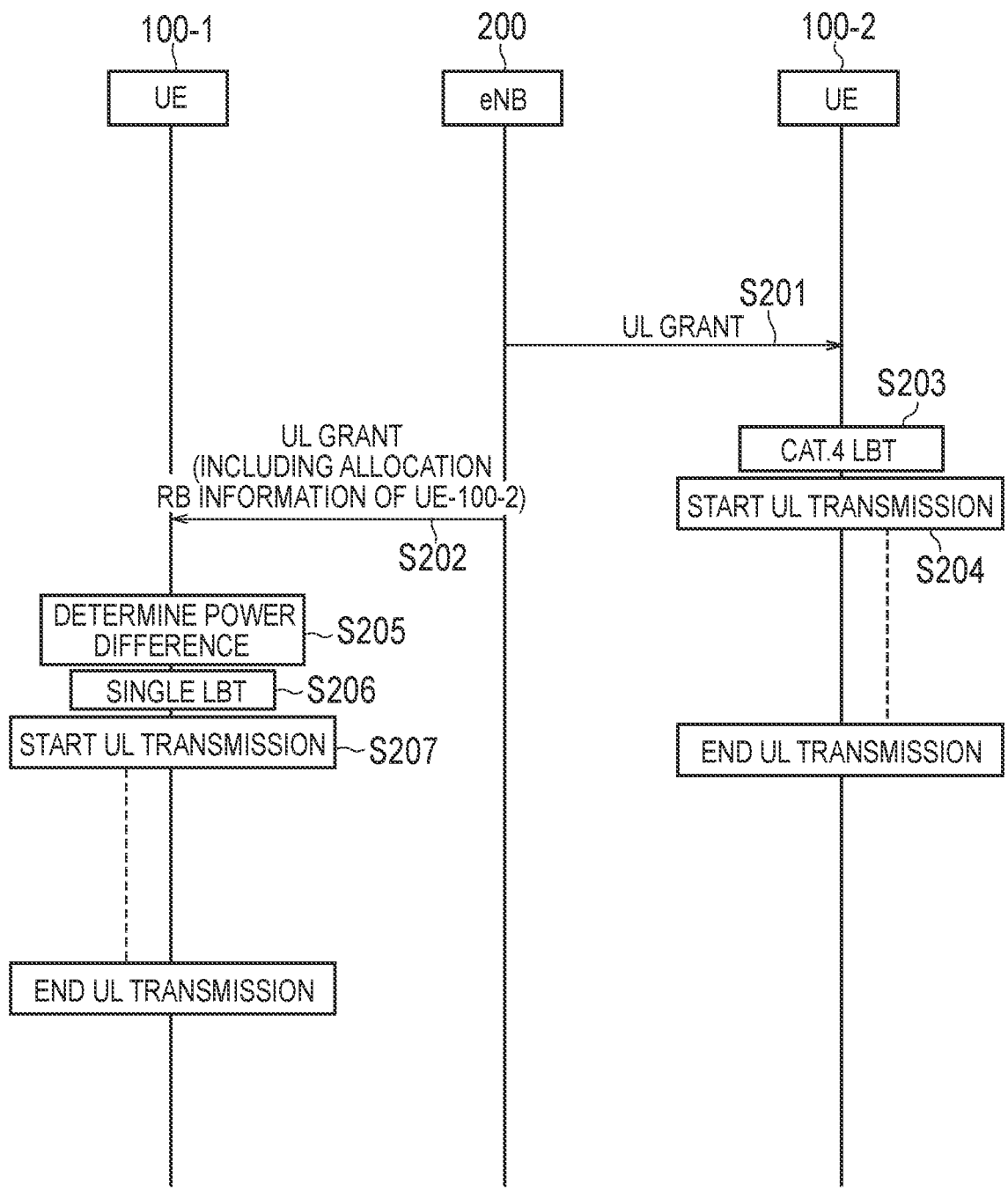
FIG. 10 is a diagram illustrating an operation example according to a second embodiment.

FIG. 10 is a diagram illustrating an operation example according to the second embodiment. In an initial state of FIG. 10, the UE 100-1 and the UE 100-2 are in the RRC connected mode.

As illustrated in FIG. 10, in step S201, the eNB 200 transmits a UL grant to the UE 100-2. The UL grant includes information or the like indicating an allocated RB of the UE 100-2 in the SCell (LAA cell).

In step S202, the eNB 200 transmits a UL grant to the UE 100-1. The UL grant includes information or the like indicating an allocated RB of the UE 100-1 in the SCell (LAA cell). Here, as there is the UE 100-2 that has already transmitted the UL grant, the eNB 200 further includes information indicating the allocated RB of the UE 100-2 (predetermined allocation information) into the UL grant of the UE 100-1.

In step S203, the UE 100-2 performs the Cat. 4-based LBT before performing UL transmission. Here, a description will be given on the assumption that the UE 100-2 succeeds in the LBT.

In step S204, the UE 100-2 starts the UL transmission in response to the success in the LBT. The UE 100-2 uses an RB allocated, on the SCell (LAA cell), based on the UL grant to transmit uplink data (PUSCH) and the like to the eNB 200. The UE 100-2 performs the UL transmission in a burst manner over a period (for example, a plurality of subframes) allocated based on the UL grant.

In step S205, before starting the UL transmission (before starting the LBT), based on the information indicating the allocated RB of the UE 100-2 (predetermined allocation information), the UE 100-1 measures the received power of each of the RB allocated to the UE 100-2 and the RB not allocated thereto to calculate a power difference therebetween. Here, a description will be given on the assumption that the UE 100 determines that the power difference is equal to or more than a threshold value and the UE 100-2 is being executing the UL transmission.

In step S206, in response to a determination that the UE 100-2 is being executing the UL transmission, the UE 100-1 applies the Single-based LBT. Here, a description will be given on the assumption that the UE 100-1 succeeds in the LBT.

In step S207, the UE 100-1 starts the UL transmission in response to the success in the LBT. The UE 100-1 uses an RB allocated thereto, on the SCell (LAA cell), based on the UL grant to transmit uplink data (PUSCH) and the like to the eNB 200. The UE 100-1 performs the UL transmission in a burst manner over a period (for example, a plurality of subframes) allocated based on the UL grant.

Third Embodiment

A third embodiment will be described with a particular focus on a difference from the first and second embodiments.

The first and second embodiments described above are an embodiment where each UE 100 autonomously determines whether or not another UE is being executing UL transmission. On the other hand, a third embodiment is an embodiment where the eNB 200 makes such a determination, and based on the determination result, the eNB 200 designates an LBT scheme to each UE 100.

The eNB 200 according to the third embodiment selects, as the LBT scheme that the UE 100 should apply, one of the Cat. 4 scheme and the Single scheme. The eNB 200 transmits information indicating the selected LBT scheme (hereinafter, referred to as "LBT scheme information") to the UE 100. The eNB 200 transmits a UL grant to the UE 100 while basically considering the Cat. 4 as a basic selection. The eNB 200 determines that the Single-based LBT is appropriate if there is another UE being executing UL transmission. The eNB 200 includes the LBT scheme information into the UL grant (PDCCH) to be transmitted to the UE 100. The eNB 200 may not need to include the LBT scheme information indicating the Cat. 4 scheme, into the UL grant. In this case, the UL grant not including the LBT scheme information may be considered as information implicitly designating the Cat. 4 scheme. If it is not possible to simultaneously perform transmission and reception on the LAA cell, the eNB 200 transmits the LBT scheme information, on the macro cell, to the UE 100 (that is, cross carrier scheduling).

The UE 100 performs LBT before UL transmission. The UE 100 determines the LBT scheme, based on the LBT scheme information included in the UL grant transmitted from the eNB 200. In response to reception of the LBT scheme information indicating the Cat. 4 scheme from the eNB 200, the UE 100 applies the Cat. 4 scheme to the LBT. On the other hand, in response to reception of the LBT scheme information indicating the Single scheme from the eNB 200, the UE 100 applies the Single scheme to the LBT. Alternatively, the UE 100 may apply the Cat. 4 scheme to the LBT, in response to reception of a UL grant including the LBT scheme information.

Figure 11:
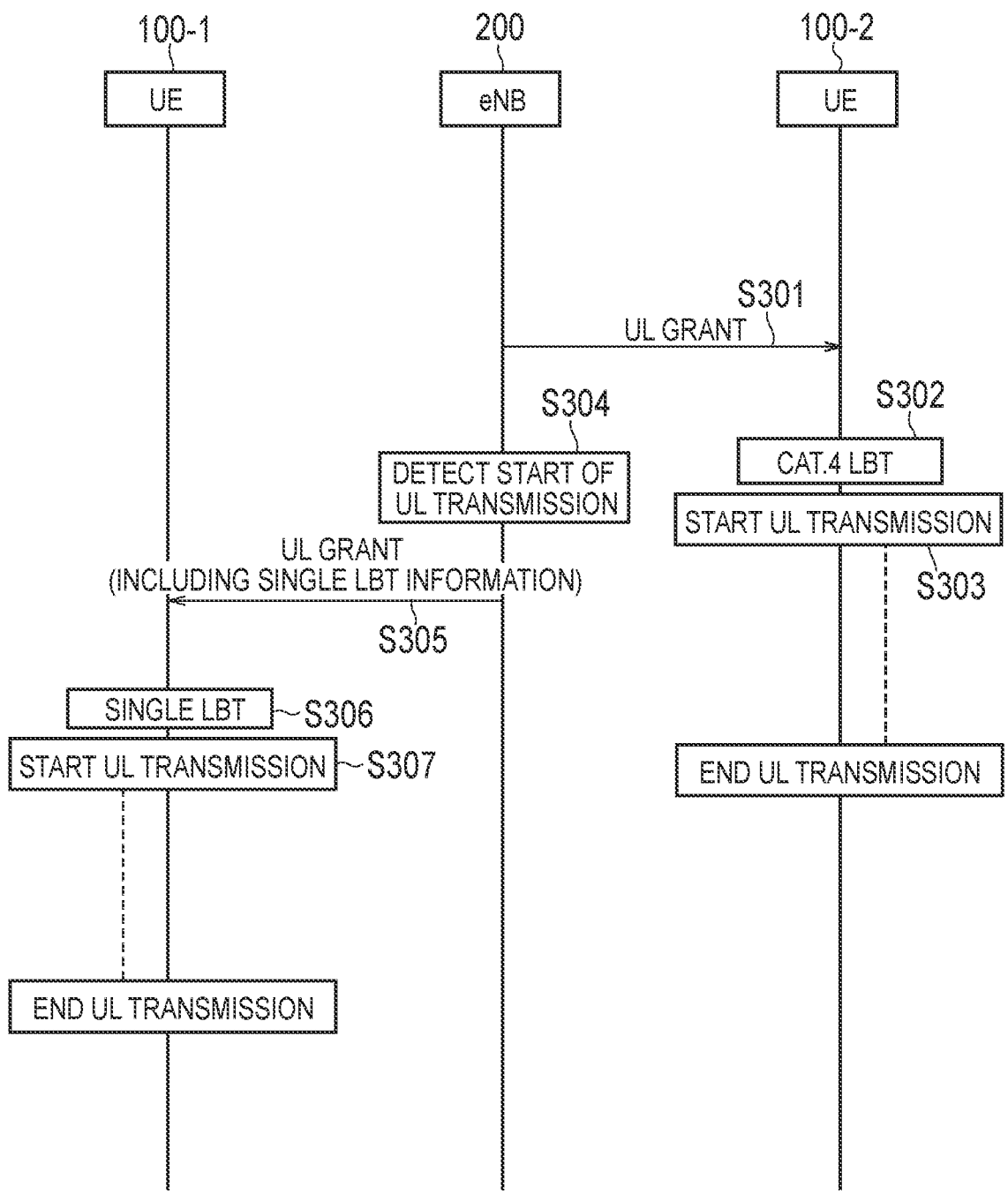
FIG. 11 is a diagram illustrating an operation example according to a third embodiment.

FIG. 11 is a diagram illustrating an operation example according to the third embodiment. In an initial state of FIG. 11, the UE 100-1 and the UE 100-2 are in the RRC connected mode.

As illustrated in FIG. 11, in step S301, the eNB 200 transmits a UL grant to the UE 100-2. The UL grant includes information and the like indicating a resource block (RB) to be allocated to the UE 100-2 in the SCell (LAA cell). Here, there is not another UE being executing UL transmission, and thus, the eNB 200 includes the LBT scheme information indicating the Cat. 4 scheme, into the UL grant. Alternatively, the eNB 200 may not need to include the LBT scheme information into the UL grant.

In step S302, in response to reception of the LBT scheme information indicating the Cat. 4 scheme or the UL grant not including the LBT scheme information, the UE 100-2 performs the Cat. 4-based LBT before performing UL transmission. Here, a description will be given on the assumption that the UE 100-2 succeeds in the LBT.

In step S303, the UE 100-2 starts the UL transmission in response to the success in the LBT. The UE 100-2 uses an RB allocated, on the SCell (LAA cell), based on the UL grant to transmit uplink data (PUSCH) and the like to the eNB 200. The UE 100-2 performs the UL transmission in a burst manner over a period (for example, a plurality of subframes) allocated based on the UL grant.

In step S304, the eNB 200 detects a UL signal (UL data) transmitted from the UE 100-2, and determines that the UE 100-2 succeeds in the LBT.

In step S305, the eNB 200 transmits a UL grant to the UE 100-1. There is the UE 100-2 being executing the UL transmission, and thus, the eNB 200 includes LBT scheme information indicating the Single scheme, into the UL grant. The eNB 200 transmits the UL grant to the UE 100-1, on the PCell (macro cell), by cross carrier scheduling.

In step S306, in response to reception of the LBT scheme information indicating the Single scheme, the UE 100-1 applies the Single-based LBT. Here, a description will be given on the assumption that the UE 100-1 succeeds in the LBT.

In step S307, the UE 100-1 starts the UL transmission in response to the success in the LBT. The UE 100-1 uses an RB allocated based on the UL grant on the SCell (LAA cell) to transmit uplink data (PUSCH) and the like to the eNB 200. The UE 100-1 performs the UL transmission in a burst manner over a period (for example, a plurality of subframes) allocated based on the UL grant.

Other Embodiments

In the embodiments described above, an example is described where an unlicensed spectrum is used as the SCell while it is assumed that a licensed spectrum is used as the PCell. However, the presence of a licensed spectrum may not necessarily be a precondition. The UE 100 and the eNB 200 may perform LTE communication using an unlicensed spectrum only.

In the above-described embodiments, an example where the same eNB 200 manages the macro cell (licensed band) and the LAA cell (unlicensed band) has been described. However, the present disclosure can also be applied to a case where different eNBs 200 manage the macro cell (licensed band) and the LAA cell (unlicensed band). Such a type of communication is referred to as "Dual Connectivity".

The embodiments described above may be implemented independently; or two or more embodiments may be combined and implemented. For example, a part of the configuration according to one embodiment may be added to another embodiment. Alternatively, a part of the configuration according to one embodiment may be replaced by a part of a configuration of another embodiment.

In the above-described embodiment, the LTE system is exemplified as the mobile communication system. However, the present disclosure is not limited to the LTE system. The present disclosure may be applied to systems other than the LTE system.

Supplementary Note

1. Introduction

In the supplementary note, issues on multiplexing of UL LAA are shown and solutions are proposed.

The following agreements are used as the basis for considering the UE multiplexing;

Agreement;

Target the support of UL multiplexing of multiple UEs in one subframe by

Multiplexing in frequency domain

The supported resource assignment (e.g. number and location of allocated RBs) is FFS Multiplexing by MU-MIMO Agreement:

For self-carrier scheduling, the following UL LBT candidate procedures should be considered A CCA duration of at least 25 us before the transmission burst The sensing duration in a CCA slot can be less than the CCA slot duration A category 4 LBT scheme with a defer period of 25 μs including a defer duration of 16 us followed by one CCA slot, and a maximum contention window size chosen from X={3, 4, 5, 6, 7}, Whether the random backoff counter is generated at the eNB and is signaled to the UE should be further studied.

When a UL grant is subject to LBT with a new random counter, whether the UL transmissions scheduled by the UL grant also uses a new random counter (previous counter is discarded) irrespective of prior success/failure in accessing the channel should be further studied.

The UL maximum contention window size should be smaller than for DL category 4 LBT Note that X=7 can be revisited later after DL LBT discussions, if necessary Energy detection threshold used for UL LBT should be further studied.

Agreement:

For UL transmission in eLAA Scells, flexible timing between the subframe carrying the UL grant and subframe(s) of the corresponding PUSCH(s) is supported Working assumption: The minimum latency is 4 ms Agreement:

In Rel-14 LAA, UL grant(s) for a UE in a subframe can enable PUSCH transmission for the UE in multiple subframes in LAA SCell for both cross-cc scheduling case and self-scheduling case.

Details should be further studied.

Agreements:

Support UL LBT based on a Cat-4 channel access procedure.

Support UL LBT based on a CCA of at least 25 μs before the UL transmission burst.

Condition and restriction on when these options are used should be further studied.

2. Channel Access Scheme for UE Multiplexing

Basically UL transmission should be configured by the eNB regardless of it is the self-scheduling or the cross-carrier scheduling (XCS) method. However, the UL transmission is then dependent on the DL transmission from the eNB. The Channel access opportunities for the UL transmissions are divided into two categories.

1. Conservative UL transmission after the DL transmission (FIG. 12).

Figure 13A:
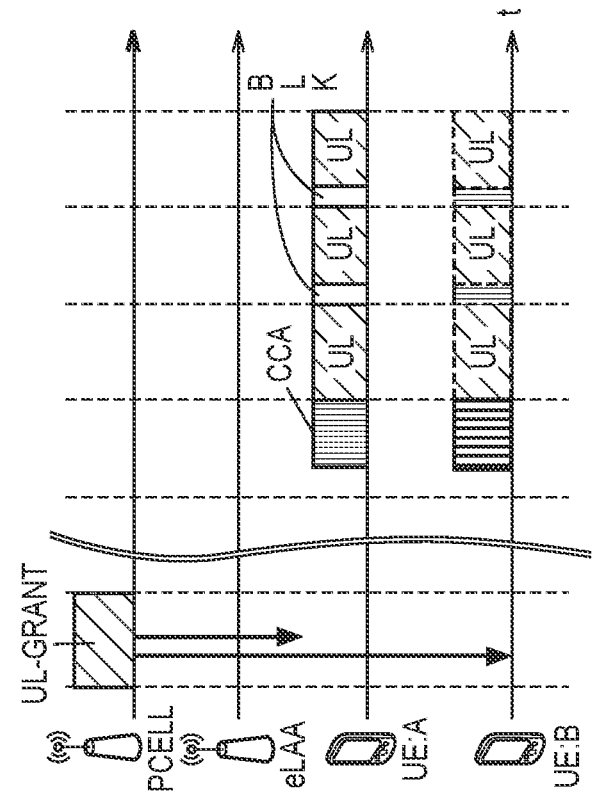
FIGS. 13A and 13B are diagrams according to the supplementary note.
Figure 13B:
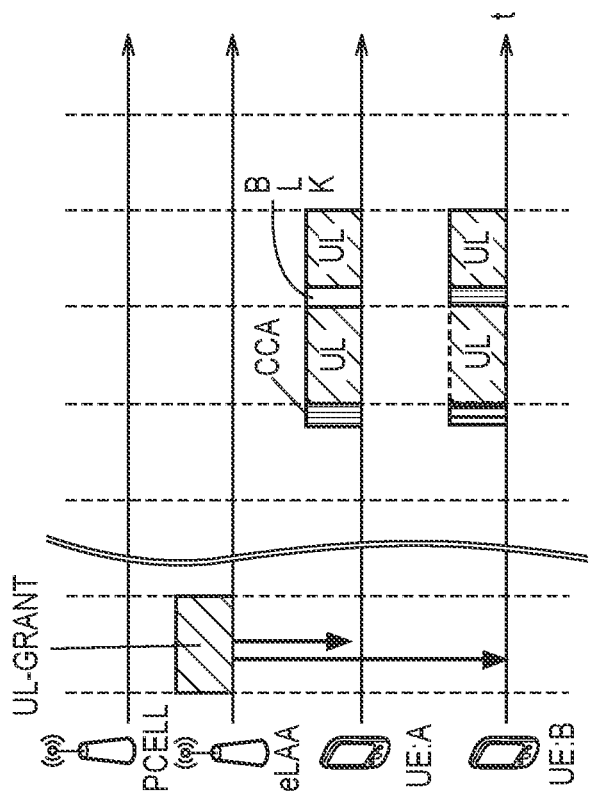

2. UL transmission independent from the DL transmission (FIGS. 13A, 13B).

Conservative UL Transmission after the DL Transmission

Figure 12:
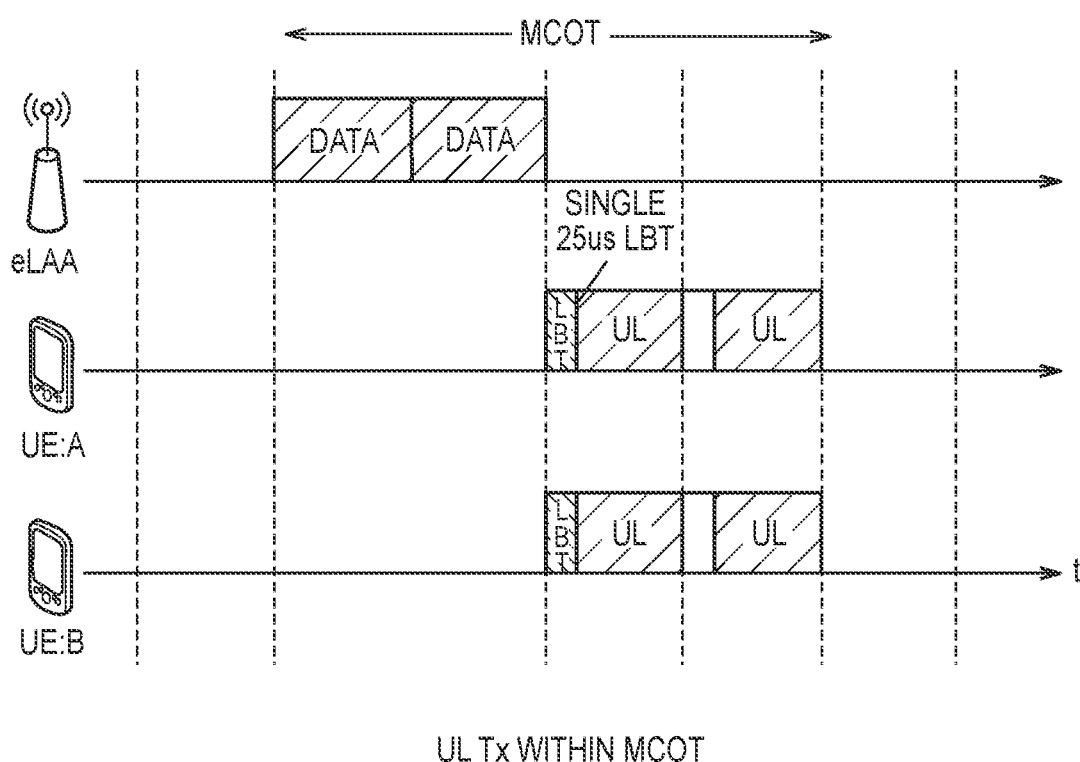
FIG. 12 is a diagram according to a supplementary note.

UEs can start its UL transmission after a 25 us LBT when the total DL/UL transmission time does not exceed the MCOT duration (FIG. 12). In this situation UL transmission will be easily aligned between scheduled UEs because UE(s) just follow the UL grants sent by the eLAA or PCell and other devices do not interrupt the UL transmission. In addition, several RAN1 members indicated a strong support for at least one symbol in a PUSCH subframe to be blanked for LBT. Therefore, at least one blank symbol enables UE to start UL transmission and conservative DL transmission with single 25 us LBT.

UL Transmission Independent from the DL Transmission

On the other hand, as shown in the above agreements, flexible timing between the subframe carrying the UL grant and subframe(s) of the corresponding PUSCH(s) is supported as shown in FIGS. 13A and 13B. If the UL grant is scheduled by self-scheduling, CW size should be smaller than CW=7 in order to alleviate the UL transmission restriction. In the XCS case there is no procedure to send the UL grant in the unlicensed band. Therefore, it propose UE(s) apply the Cat.4 LBT procedure as done for the DL transmissions in order to reduce impact on other devices.

Proposal 1: For XCS, Cat.4 LBT like a DL transmission should be applied for the UL transmissions.

However, it is very difficult to align the transmission timing between the scheduled UEs if Cat.4 LBT is used for the UL transmissions because each CW size would be configured by the UE itself. One approach is to fix the CW size for the UL transmissions. But this approach may still not work because of the CCA counter misalignment between all the UEs located in the proximity (FIG. 13B). To solve this problem, it proposes 4 options as solutions which are shown below:

1) Deferring Transmission Timing

If UEs which finished CCA counter of CW-1 defer its transmission and carry out one CCA before starting the transmission burst. In this case, the collisions will be avoided. However, the transmission deferring gives other devices more opportunity to access the channel. This results in degradation in the throughput. Therefore, this solution is not preferable.

2) Reservation Signal

After performing the CCA the UE can transmit the reservation signal until the start of the scheduled transmission burst. If UEs which have not finished their LBT yet and can see reservation signal from a specific UE then the UE can subtract power of reservation signal from the total detected power. Removing power of reservation signal alleviates UE LBT procedure. However, this solution increases the receiver complexity and increase the standardizations effort.

3) Indication

After performing the CCA the UE's UL transmissions could cause interference to other UEs that are still performing LBT. However, if the UE(s) that have started their UL transmission transmits an indicator (e.g., specific reference signal) for those UEs which are still performing LBT then the other UE(s) can detect the indicator and start transmitting after performing a 25 us LBT for the second subframe. This method also helps those UEs which are scheduled to transmit in the middle of the burst transmissions since these are unaware if they are at the beginning of the MCOT. Therefore, in our opinion transmitting an indicator by the UEs which have completed their CCA provides a good solution and must be studied further.

4) Narrow Band LBT

If the UEs are allowed to carry out LBT in only scheduled RB, then the UE can easily identify if the channel is available for their own transmissions. However, this solution only works for the LTE devices since only those devices have the needed information about the scheduled RBs. Therefore, the Narrow band LBT can be applied in limited situations such as when it is known there are no non-LTE devices in the proximity.

Although above solutions have each pros and cons, it thinks the indication method is most reasonable solution talking into account for flexible scheduling and UE complexity.

Proposal 2: To Support flexible scheduling and multiplexing, some of indication shared between scheduled UEs should be applied.

INDUSTRIAL APPLICABILITY

The present disclosure is useful in the field of communication.

The invention claimed is:

1. A communication control method used in a mobile communication system supporting uplink transmission using an unlicensed spectrum, comprising:
   selecting, by a base station, as a scheme of LBT (Listen-Before-Talk) that a radio terminal needs to apply, one of a first LBT scheme and a second LBT scheme with a shorter LBT time interval than the first LBT scheme;
   transmitting, by the base station to the radio terminal, an uplink grant for scheduling a PUSCH transmission in a secondary cell, the uplink grant including information indicating the selected LBT scheme;
   performing, by the radio terminal, LBT of the first LBT scheme before the uplink transmission, in response to reception of the uplink grant including the information indicating the first LBT scheme from the base station; and
   performing, by the radio terminal, LBT of the second LBT scheme before the uplink transmission, in response to reception of the uplink grant including the information indicating the second LBT scheme from the base station, wherein
   the uplink transmission includes a PUSCH transmission in a secondary cell employed in the unlicensed spectrum,
   a condition, on which the base station selects the second LBT scheme as the scheme of the LBT that the radio terminal needs to apply, is that another radio terminal is performing the uplink transmission, and
   the selecting by the base station comprises:
      determining whether the another radio terminal is performing the uplink transmission;
      determining whether to satisfy the condition in response to determining whether the another radio terminal is performing the uplink transmission;
      selecting the first LBT scheme in response to determining not to satisfy the condition, and
      selecting the second LBT scheme in response to determining to satisfy the condition.

2. The communication control method according to claim 1, wherein the determining whether the another radio terminal is performing the uplink transmission includes:
   determining whether the another radio terminal is performing the uplink transmission, based on a radio signal transmitted from the another radio terminal.

3. The communication control method according to claim 1, wherein
the uplink grant includes predetermined allocation information indicating an uplink radio resource, for the uplink transmission, allocated to the another radio terminal.

4. A base station used in a mobile communication system supporting uplink transmission using an unlicensed spectrum, comprising:
a controller configured to select, as a scheme of LBT (Listen-Before-Talk) that a radio terminal needs to apply, one of a first LBT scheme and a second LBT scheme with a shorter LBT time interval than the first LBT scheme, wherein
the controller performs a process of transmitting, to the radio terminal, an uplink grant for scheduling a PUSCH transmission in a secondary cell, the uplink grant including information indicating the selected LBT scheme,
the uplink transmission includes the PUSCH transmission in the secondary cell employed in the unlicensed spectrum
a condition, on which the base station selects the second LBT scheme as the scheme of the LBT scheme that the radio terminal needs to apply, is that another radio terminal is performing the uplink transmission, and
the selecting by the base station comprises:
determining whether the another radio terminal is performing the uplink transmission;
determining whether to satisfy the condition in response to determining whether the another radio terminal is performing the uplink transmission;
selecting the first LBT scheme in response to determining not to satisfy the condition, and
selecting the second LBT scheme in response to determining to satisfy the condition.

* * * * *